United States Patent [19]

van Zon

[11] Patent Number: 5,426,667
[45] Date of Patent: Jun. 20, 1995

[54] SYSTEM FOR THE CONTACTLESS EXCHANGE OF DATA, AND RESPONDER FOR USE IN SUCH A SYSTEM

[75] Inventor: Bernardus C. M. van Zon, Hengelo, Netherlands

[73] Assignee: N.V. Nederlandsche Apparatenfabriek NEDAP, de Groenlo, Netherlands

[21] Appl. No.: 77,521

[22] Filed: Jun. 17, 1993

[30] Foreign Application Priority Data

Jun. 18, 1992 [NL] Netherlands ............... 9201072

[51] Int. Cl.6 ........................................ H04B 1/00
[52] U.S. Cl. ........................................ 375/219; 455/41
[58] Field of Search ............................ 455/41; 375/7

[56] References Cited

U.S. PATENT DOCUMENTS

| | | | |
|---|---|---|---|
| 3,689,885 | 9/1972 | Kaplan et al. | 455/41 |
| 3,898,565 | 8/1975 | Takeuchi et al. | 455/41 |
| 5,054,112 | 10/1991 | Ike | 455/41 |
| 5,070,500 | 12/1991 | Horinouchi et al. | 455/41 |
| 5,128,972 | 7/1992 | Horinuchi et al. | 455/41 |
| 5,293,400 | 3/1994 | Monod et al | 455/41 |

FOREIGN PATENT DOCUMENTS

| | | |
|---|---|---|
| 0242906 | 10/1987 | European Pat. Off. . |
| 0395188 | 10/1990 | European Pat. Off. . |
| 0446519 | 9/1991 | European Pat. Off. . |
| 0459477 | 12/1991 | European Pat. Off. . |

*Primary Examiner*—Edward L. Coles, Sr.
*Assistant Examiner*—Kimberly A. Williams
*Attorney, Agent, or Firm*—Jacobson, Price, Holman & Stern

[57] ABSTRACT

Disclosed is a system for the contactless exchange of data between one or more transmitter/receiver devices and a plurality of responders. According to the invention, at least one of the responders is designed to exchange data via a microwave connection with a transmitter/receiver device operating in the microwave range, and to exchange data via an inductive coupling with an inductively operating transmitter/receiver device.

22 Claims, 7 Drawing Sheets

SYSTEM FOR THE CONTACTLESS EXCHANGE OF DATA, AND RESPONDER FOR USE IN SUCH A SYSTEM

The invention relates to a system for the contactless exchange of data between a transmitter/receiver device and a responder. The invention further relates to a responder for use in such a system. In practice, such responders are also designated by other terms, such as, for instance, transponder, data carrier, label, electronic pass, chip card, etc.

For the transmitter/receiver device, too, various other designations are used, such as, for instance, interrogator or reader. Further, it is not strictly necessary for the transmitter, which can generate an interrogation field, to be combined into a single unit together with the receiver device. The terms as used hereinafter should be interpreted in the sense indicated hereinabove.

Systems for the contactless exchange of data are known in different designs and types. Applicant's Dutch patent 176,404, for instance, describes a system comprising a passive responder, i.e., a responder which does not possess a battery of its own and which draws the supply energy required for the functioning of the active electronic components of the responder circuit from the electromagnetic interrogation field, by means of which digital information stored in the responder can be detected. Similar systems, where the responders do comprise a battery, are also know. Further, systems are known which provide the possibility of contactless modification of data stored in the memory of a responder. Such reprogramming of responders can be effected with the interrogator device employed for normal use, adapted for that purpose, or with a special writing device or reprogramming device. Such a system is for instance described in applicant's European patent 0,242,906. A reprogrammable responder may also comprise one or more sensors which can observe a physical parameter and store the value thereof in the memory of the responder. Such a system is disclosed in applicant's European patent application 0,395,188.

Appliant's Dutch patent application 9,002,683 discloses an identification system operative in the microwave range, with a microwave responder with retroreflective properties. Microwave systems have an advantage over inductively operating responder systems in that a relatively large detection distance between transmitter/receiver and responder and a higher velocity of motion of the object to be identified are possible utilizing relatively small antenna dimensions. However, a drawback is that microwave apparatus is relatively complex. In particular, portable readers and portable programming devices for the responders are difficult to make. Portable inductively operating readers and programming devices are simpler to realize than comparable microwave devices. On the other hand, a drawback of inductively operating systems is that although it is very well possible to read and program responders at a relatively short distance, an increase of the identification path with a view to identifying (fast) moving abjects is very troublesome. For this purpose, antennas must be used which have dimensions of the order of magnitude of the desired identification path. This is in contrast with what is the case with microwave identification systems.

For a number of applications, a random example being the logistic handling of product flows, there is a need for an identification system which combines the advantages of a microwave system with the advantages of an inductive system. The object of the present invention is to provide for this need. To that end, according to the invention, a system of the above-described type is characterized in that at least one of the responders is designed to exchange data via a microwave connection, with a transmitter/receiver device operating in the microwave range and to exchange data via an inductive coupling, with an inductively operating transmitter/receiver device.

Hereinafter, the invention will be further described with reference to the accompanying drawings of some exemplary embodiments.

Figure 1:
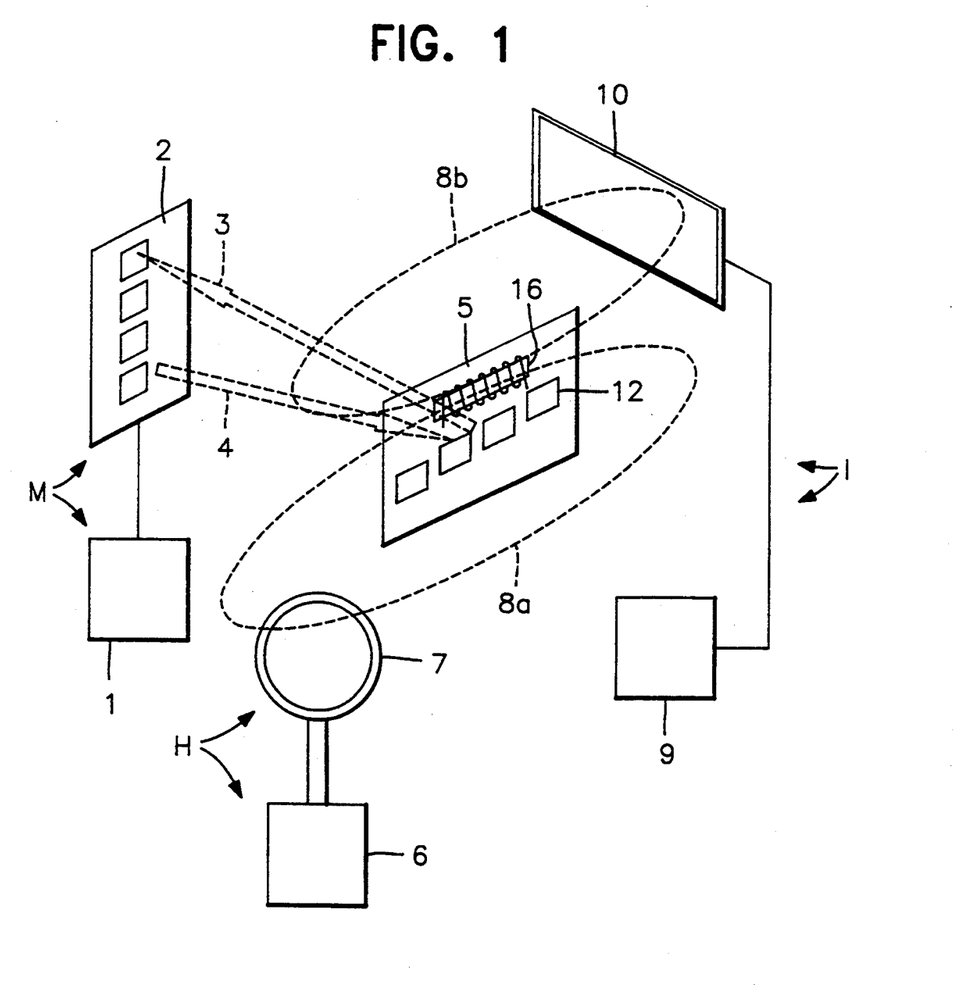
FIG. 1 schematically shows an example of a system according to the invention.

FIG. 1 shows the basic concept of the invention. A microwave reader M, comprising a reader unit 1, sometimes referred to as interrogator unit or transmitter/receiver device, and an antenna array 2, emits in operation an electromagnetic wave 4 in the direction of a responder 5. The responder 5 comprises means for modulating a received microwave signal with information from a data carrier (not shown separately), which is part of the responder. The data carrier comprises at least a binary memory section, while, further, associated digital circuits for feeding data to the memory section and reading the content of the memory section or particular memory locations thereof are provided. The responder further comprises means 12 for reflecting a modulated electromagnetic wave 3 in the direction of the reader M. The responder further comprises means 16 for exchanging data with the responder by means of an inductive read/write station which may or may not be portable.

The drawing shows a portable, inductively operating transmitter/receiver device H, comprising a read/write unit 6 and an antenna device 7 by means of which an inductive coupling (indicated at 8a) between the device H and the responder 5, in particular the means 16, can be effected.

A fixedly arranged inductive read/write station I, comprising an antenna 10 and a read/write unit 9 can in operation exchange data with the responder via an inductive coupling 8b.

Figure 2:
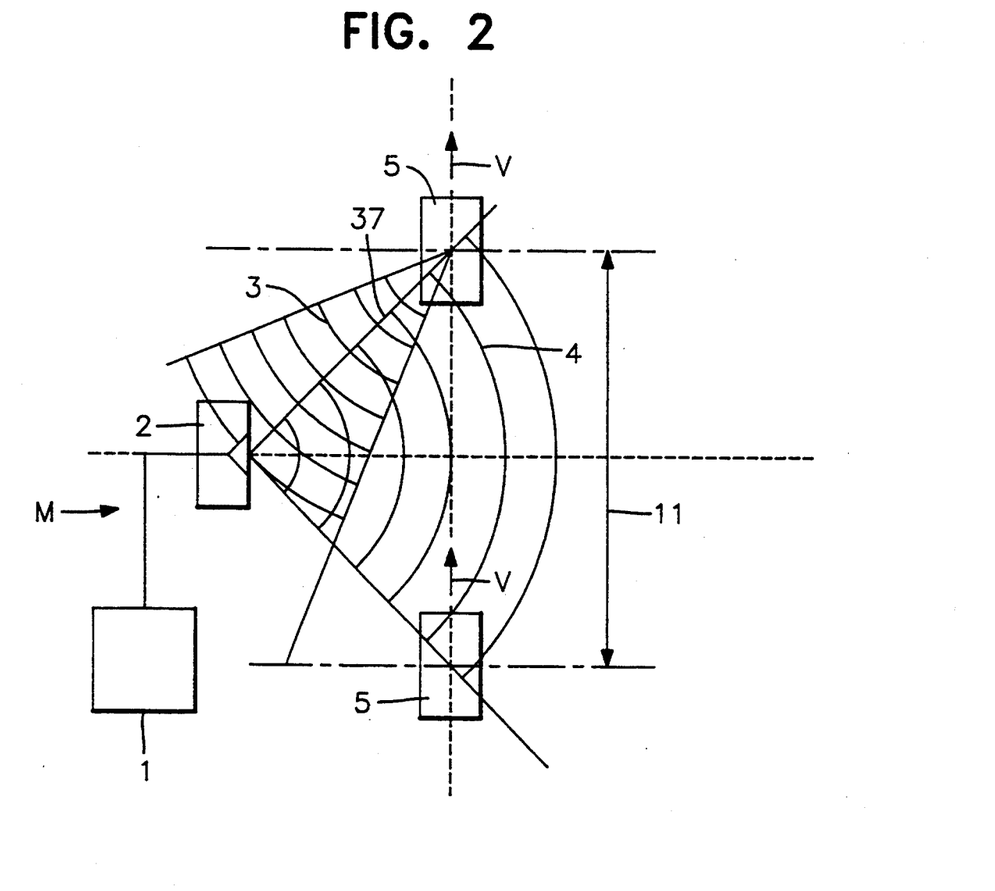
FIG. 2 illustrates the operation of a microwave system for contactless data exchange.

FIG. 2 illustrates the operation of a microwave system and in particular a system based on the retroreflective principle, which system makes a long identification path possible, so that objects with a high velocity of motion can be identified as well. The data speed across the connection, however, can yet be low and be in agreement with the data speed associated with inductive systems.

A microwave reader with an interrogator unit 1 and an antenna array 2 emits in operation an electromagnetic wave 4 which forms a broad beam in the plane of the expected motion of the object and forms a narrow beam in a plane perpendicular thereto. Such a substantially fan-shaped beam with a large range can be generated without the necessity of large antennas. With an inductive coupling, a comparable range could only be realized by using an antenna coil with dimensions of the order of magnitude of the object to be identified. The responder is shown in two positions, indicated by 5 and 5', and comprises means for modulating the received wave with information from a data carrier and for reflecting it, as indicated at 37, in the direction of the antenna array 2 of the interrogator station. By using a responder with retroreflective properties, an identification path 11 of extended length is created, so that the responder, in spite of its high velocity of motion V, can yet be read at a relatively low data speed.

Figure 3:
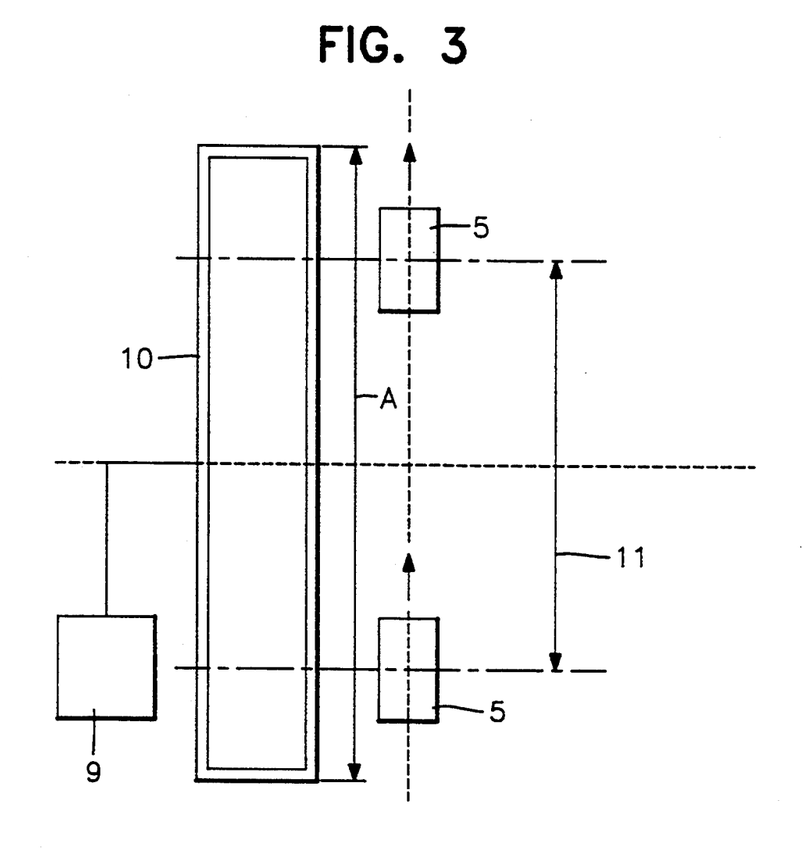
FIG. 3 illustrates the operation of an inductively operating system for contactless data exchange.

FIG. 3, for comparison, schematically shows an arrangement with an inductively operating identification system. The interrogation antenna 10 or assembly of antennas of the inductive identification system should have dimensions A, at least in the direction of motion of the responders 5, of the order of the length of the identification path 11, which is necessary to enable identification of fast moving objects with a certain data speed.

As will be explained in more detail hereinafter, this drawback can be obviated according to the invention by using a microwave interrogator unit as indicated in FIGS. 1 and 2, in combination with a responder which can be identified or read and optionally programmed both in the conventional inductive manner and by means of microwaves. The possibility of reading and programming with a read/write unit is maintained by the integration of both interface techniques in the responder.

Figure 4:
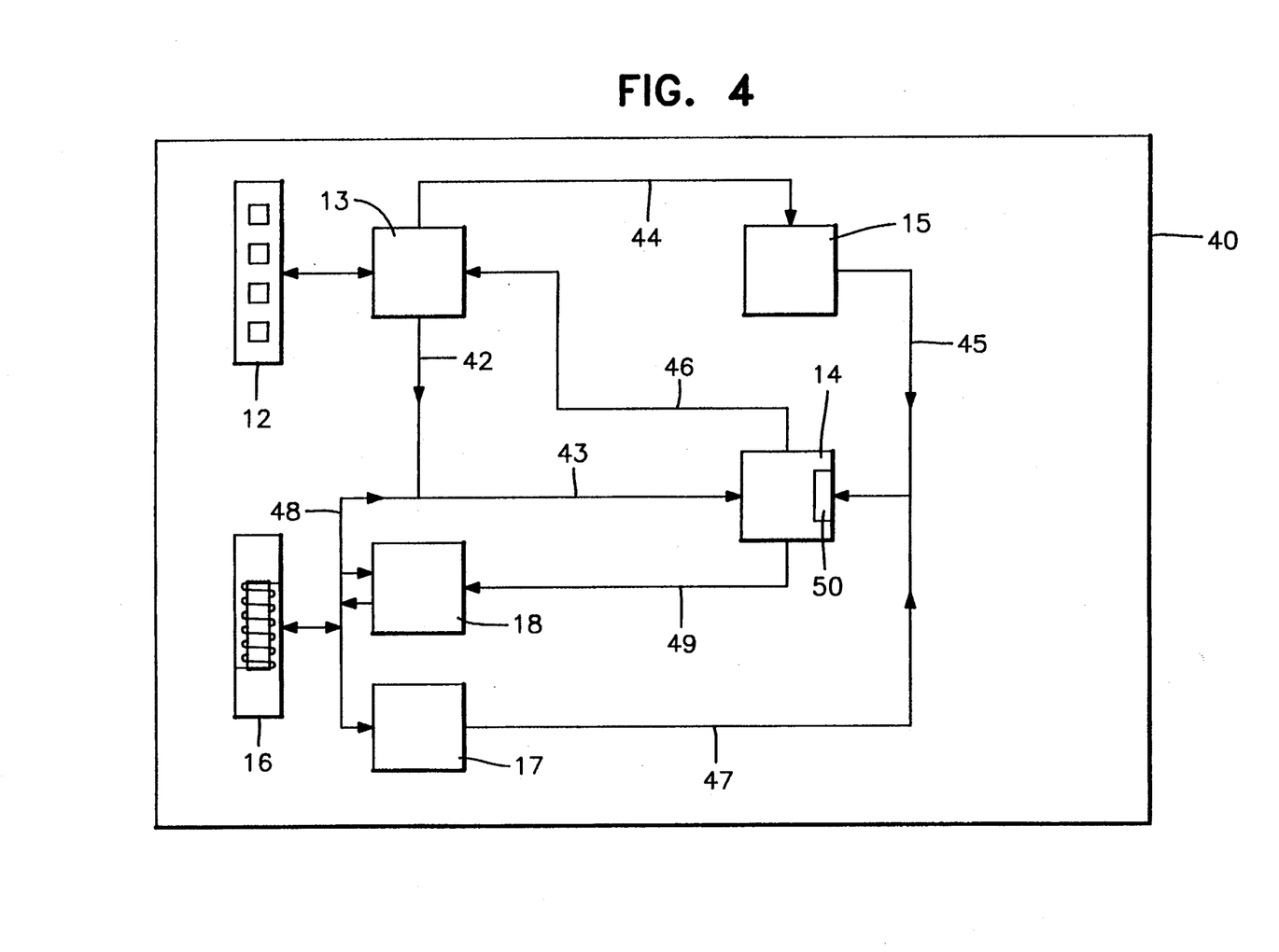
FIG. 4 shows a block diagram of an exemplary embodiment of a responder for a system according to the invention.

FIG. 4 schematically shows an exemplary embodiment of an integrated microwave/inductive responder 40 without a battery. The responder 40 comprises a microwave interface 12, formed preferably by a patch antenna array, which provides for the relay of a received microwave signal to a demodulator/modulator unit 13. The received microwave signal has been modulated in the transmitter/receiver device with a frequency which is suitable for use in an inductively operating identification system. Advantageously, this frequency may also be the clock frequency of the digital eletronic part of the responder. The demodulator/modulator unit 13 provides for the detection of the clock signal, for the modulation of the signal to be reflected with data, supplied via a line 46 from an electronic data carrier 14, forming part of the responder, and for the retroreflection of the now modulated received microwave energy in the direction of the interrogator station. The clock signal obtained by demodulation is applied to the data carrier via a line 42, 43 and also to an AC/DC converter 15 via a line 44, which converter 15 forms a DC supply voltage from the clock signal provided and feeds it to the data carrier 14 via line 45.

In inductive operation, the inductive interface 16, preferably comprising an air-cored coil or a coil wound onto a ferrite rod, supplies the energy induced in the coil by a transmitter/receiver device I, which energy, to advantage, again has a frequency equal to the clock frequency for the data carrier 14, to the data carrier 14 via line 48, 43, and further to an AC/DC converter 17 and a modulator 18. The AC/DC converter 17, for instance a rectifier, again supplies a DC supply voltage for the data carrier 14 via a line 47. The modulator 18 modulates the induced energy in the inductive interface 16 with information obtained via a line 49 from the data carrier, enabling transfer of information from the data carrier to a portable read/write unit or fixed inductive interrogator station. Through modulation of the induced energy originating from the fixed or portable read/write unit, a modulated supply voltage for the data carrier is formed, which modulation is demodulated by means of a detector 50 and is translated into data which is stored in the data carrier. The coil of the inductive interface may be tuned to a predetermined frequency corresponding to a frequency of the interrogation field, by means of a capacitor. However, this is not strictly necessary.

In principle, the data carrier can also be programmed by using the (clock) signal modulated on the microwave signal as auxiliary carrier wave for the data to be written in the data carrier, reaching the detector 50 via line 45.

Figure 5:
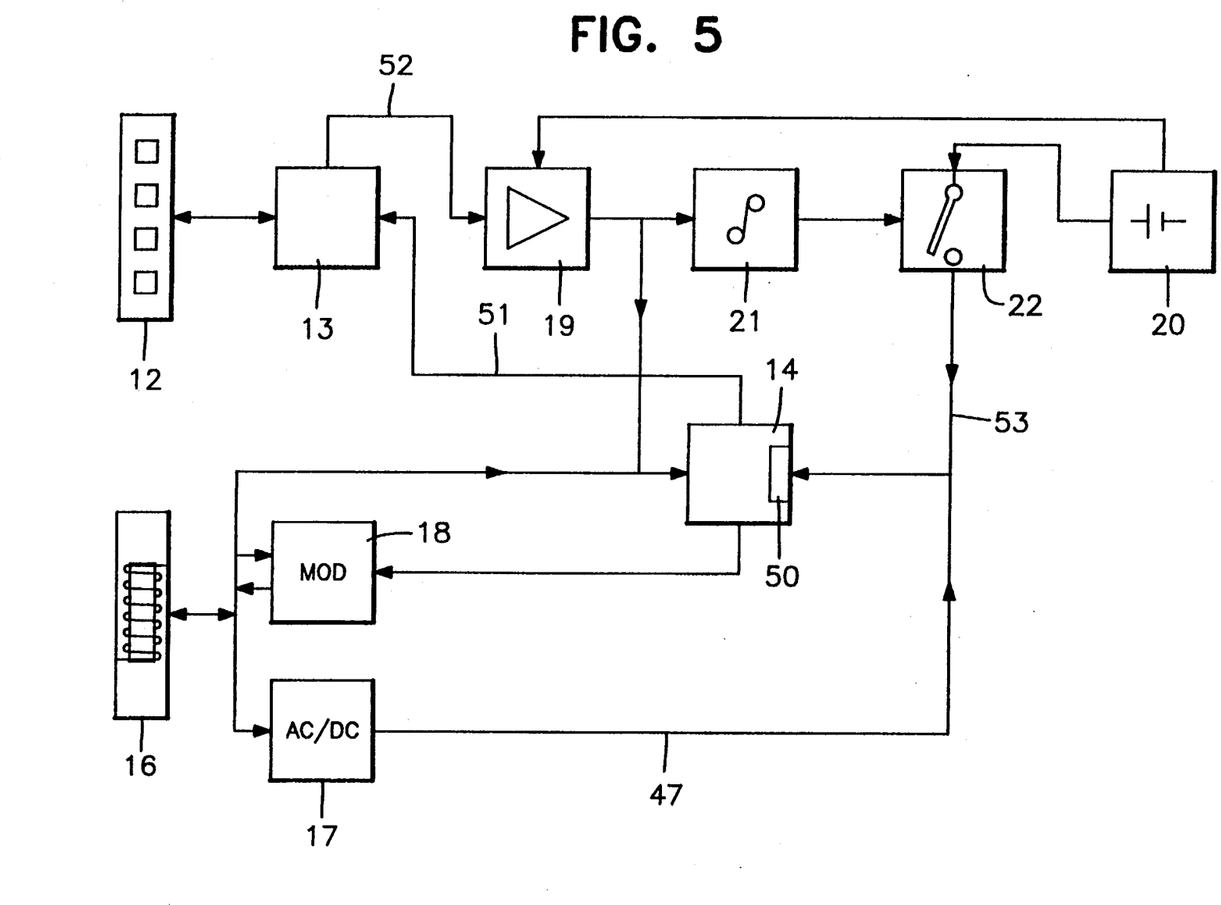
FIG. 5 shows a block diagram of a second exemplary embodiment of a responder for a system according to the invention.

FIG. 5 schematically shows an exemplary embodiment of an integrated microwave/inductive responder provided with battery supply. The responder again comprises a microwave interface 12, preferably a patch antenna array, which provides for the relay of a microwave signal preferably modulated with the clock frequency for the electronic part, to a demodulator/modulator unit 13. Because of the battery supply, the received microwave energy may be smaller by one order than in the responder of FIG. 4, so that the transmitting power of the interrogation station can be small.

The demodulator/modulator unit 13 provides for the detection of the clock signal and for the modulation of the received microwave energy with information supplied from the data carrier via a line 51 and for the (retro) reflection of the modulated received microwave energy in the direction of the interrogator unit. The demodulated clock signal is supplied via a line 52 to an amplifier 19, which brings the clock signal to a level suitable for use by the data carrier 14. The amplifier 19 is an amplifier with a very low energy consumption, so that it is possible for this amplifier to be continuously connected with the energy source 20. The energy source 20 can for instance be a lithium battery or a solar cell.

An integrator 21 integrates and filters the amplified clock signal and will, if the clock signal is present sufficiently long, operate a DC voltage switch 22, for instance a suitable FET or CMOS gate, which connects the energy source 20 via line 53 with the data carrier 14. Thus, the energy consumption of the responder in the "sleep" mode can be limited as much as possible. The received clock signal accordingly functions as a "wake-up" signal for the responder.

During inductive operation, the inductive interface 16, preferably comprising a tuned or non-tuned air-cored coil or a coil wound onto a ferrite rod, supplies the energy induced by the inductive transmitter/receiver device, which energy may again advantageously have a frequency equal to the clock frequency for the data carrier 14, to an AC/DC converter 17 and domodulator 18. The AC/DC converter 17 again supplies a DC voltage for the data carrier. Similarly to the embodiment of FIG. 4, the modulator 18 modulates the induced energy in the inductive interface 16 with data from the data carrier 14, which enables transfer of data from the data carrier to a read/write unit of fixedly arranged inductive interrogation station.

By modulation of the induced energy originating from a fixed or portable read/write unit, there is formed via converter 17 a modulated supply voltage for the data carrier, which demodulates this modulation by means of detector 5 and translates it into data which is stored in the data carrier.

Figure 6:
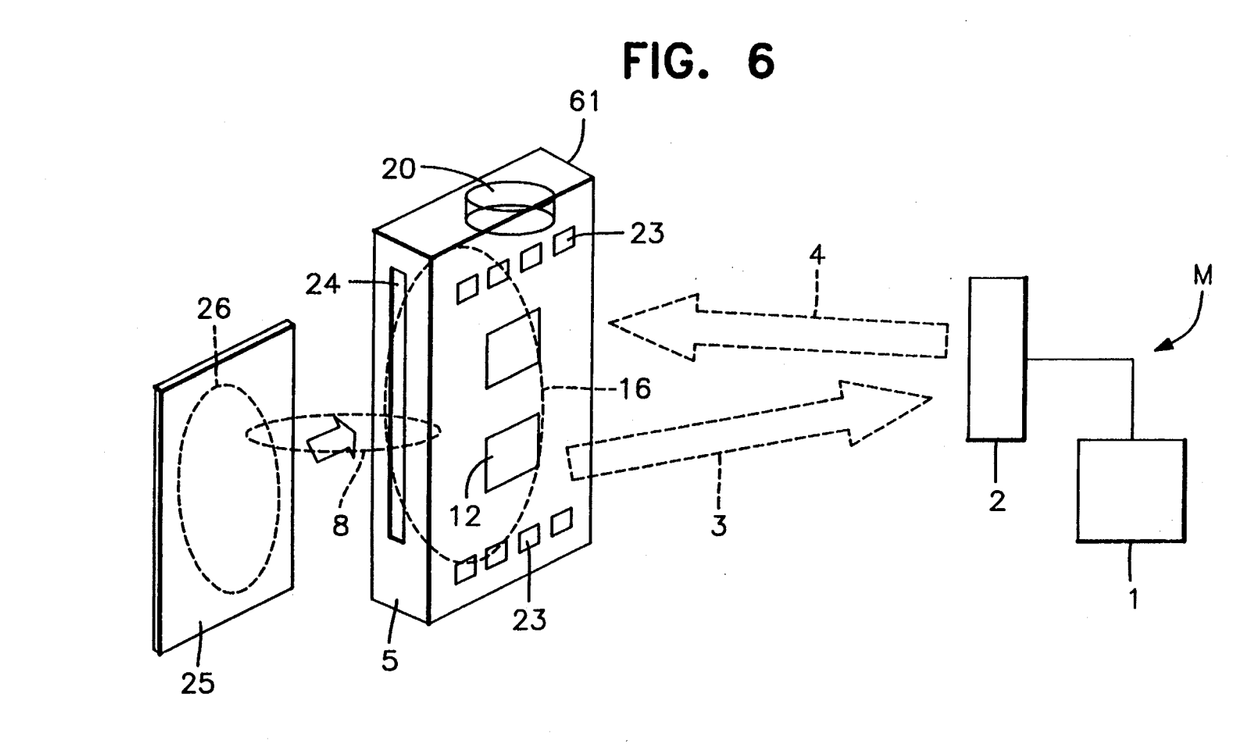
FIG. 6 schematically shows a system according to the invention comprising a special responder.

FIG. 6 schematically shows an exemplary embodiment of an integrated microwave/inductive responder, where the data carrier is removable from the responder. The removable data carrier can be coupled with the responder via contacts but is preferably inductively coupled with the responder. The integrated responder 5 shown comprises a conductive interface, schematically indicated at 16, a microwave interface 12, a battery 20 and/or a plurality of solar cells 23 and a slot 24 via which a removable data carrier 25 can be slipped into the responder housing 61. The insert unit 25 comprises its own inductive interface 26 formed by an antenna coil conventional for inductively operating responders, which antenna coil may optionally be part of a tuned circuit with a predetermined resonant frequency.

After insertion of a removable unit 25, which contains the data carrier, and in the presence of an electromagnetic wave 4, modulated with a clock signal, the data carrier will yield information to, or receive information from, the integrated responder 5 via the inductive coupling 8.

The information from the data carrier of the inert unit 25 will be modulated on the received microwave energy 4 by the modulator 13 (see FIGS. 4 or 5) and be (retro)reflected in the direction of the interrogator unit M, which comprises a transmitter/receiver antenna 2 and a transmitter/receiver unit 1.

Figure 7:
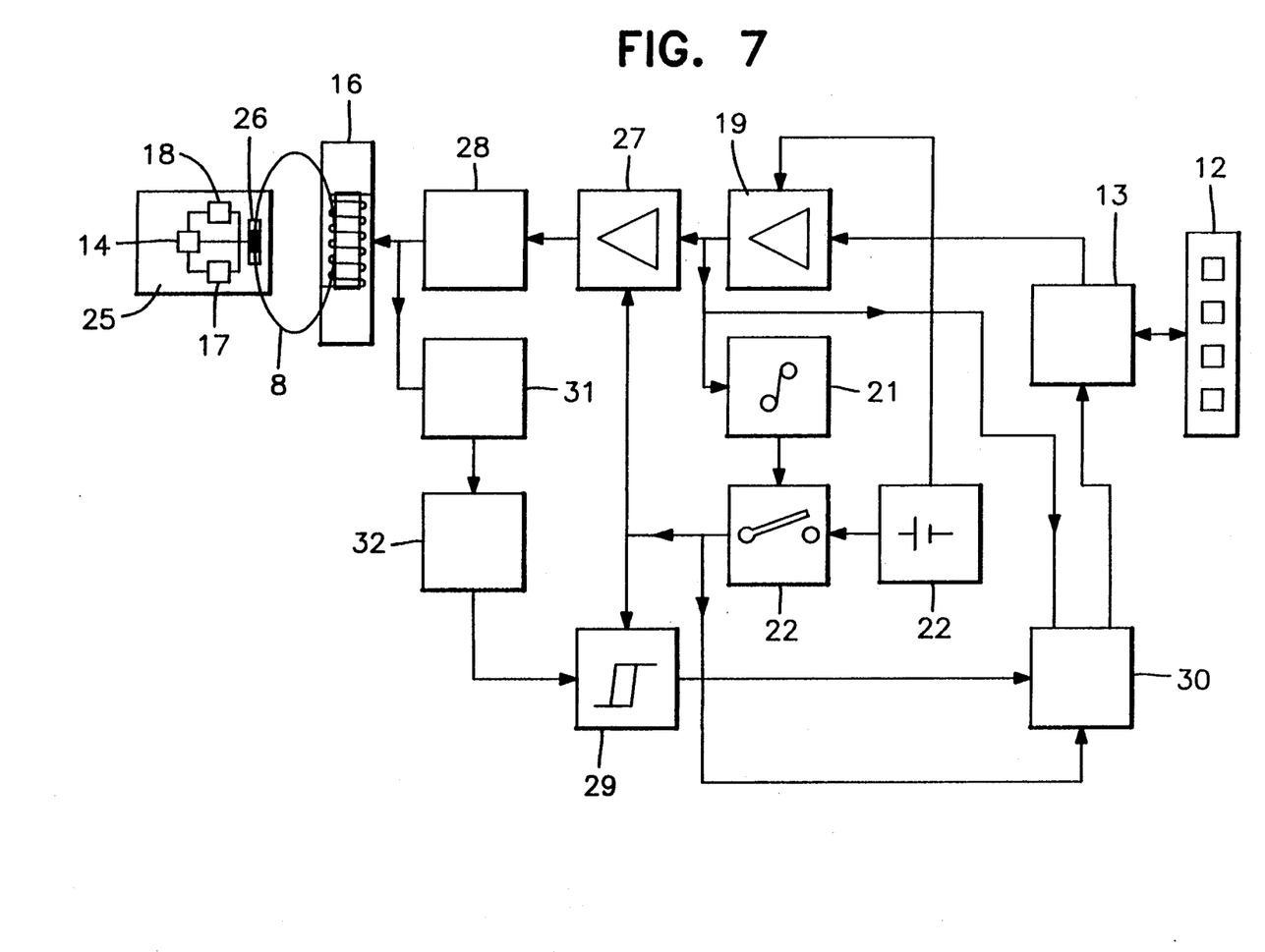
FIG. 7 shows a block diagram of a responder according to FIG. 6.

FIG. 7 schematically shows in more detail an embodiment of an integrated microwave/inductive responder, supplied by a battery and/or solar cell, the data carrier of this responder being removable. The removable data carrier is constructed as insert unit 25 and comprises the data carrier 14 with a control and storage function, an AC/DC converter 17, which may be a conventional rectifier, a modulator 18 and an inductive interface 26, preferably comprising an air-cored coil or a tuned or non-tuned coil wound onto a ferrite rod. Via the interface 26, the insert unit couples contactlessly via the magnetic field 8 with the inductive interface 16 of the integrated responder 5. The responder further comprises a microwave interface 12, preferably designed with a patch antenna array, which provides for the relay of the microwave signal, modulated with a predetermined frequency, to a demodulator/modulator unit 13. The predetermined frequency, again, can advantageously be equal to the clock frequency of the data carrier, but may also have a value such that the clock frequency can be derived therefrom relatively simply. This also applies to the previously described examples. The received microwave energy can be smaller by one order than with the passive responder shown in FIG. 4, so that the transmitting power of the interrogator station can be small. During microwave operation in the manner described, the demodulator/modulator unit 13 provides for the detection of the clock signal and for the modulation of the received microwave energy with information provided by the removable insert unit 25 via the inductive interface 26, 8, 16, and for the (retro)reflection of the thus modulated microwave energy in the direction of the interrogator unit. The detected clock signal is applied to an amplifier 19 which brings the clock signal to a level suitable for driving a second amplifier 27. The second amplifier provides the inductive interface 26, via an adapter filter 28 and coil 16, with sufficient energy to activate the insert unit 25. The amplifier 19 is an amplifier with a very low energy consumption, so that this amplifier can be allowed to be continuously connected with the energy source 20. The energy source 20 preferably consists a lithium battery or one or more solar cells 23 (see FIG. 6).

The integrator 21 integrates and filters the received clock signal and will, if the clock signal is present sufficiently long, operate a DC voltage switch 22, which connects the energy source 20 with a threshold detector 29, the amplifier 27 and an encoder 30, so as to limit the energy consumption of the responder in the "sleep" mode as much as possible.

The received clock signal accordingly functions as "wakeup" signal for the responder and also as interrogation or read signal for the insert unit. The inductive interface 16, preferably consisting of an air-cored coil or a coil wound onto a ferrite rod, delivers the clock signal modulated by the removable insert unit to a detector 31. After filtering by filter 32, which filters out the carrier wave frequency (clock signal frequency) and limits the band width, the output signal of the detector is applied to a threshold detector 29, which makes the amplitude and flanks of the received data suitable for driving the encoder 30. This encoder modulates the data on a subcarrier wave, which is derived from the received signal, which is directed via a line 60 from the output of the amplifier 19 to the encoder 30. In a practical situation, the subcarrier wave may for instance have a frequency which is half the frequency of the clock signal. This modulated subcarrier wave is modulated on the received microwave energy by the demodulator/modulator 13 and, via the microwave interface 12, (retro)reflected in the direction of the interrogating station.

The insert unit can be programmed in the simplest manner by bringing the loose unit into the field of a suitable inductive read/write device. In principle, the insert unit can also be programmed via the microwave interface 12 (by modulation of the clock signal) while the insert unit is situated in the integrated responder. It is even conceivable that the insert unit in inserted condition is programmed via the inductive interface.

It is observed that after the foregoing, various modifications will readily occur to a person of ordinary skill in the art. It has already been mentioned that it is possible to effect the inductive couplings by means of coils that may or may not be tuned. Further, in the foregoing, there was presumed an inductive interrogation field provided by a portable or non-portable inductive read/write unit or the like, or, in the case of an insert unit, by the inductive interface of the responder, the frequency of which is equal to the clock frequency required for the data carrier. However, the clock frequency could also be derived from the frequency of the interrogation field, for instance by frequency division or multiplication. Nor is it strictly necessary that the frequency modulated on the interrogating microwave signal is equal to the clock frequency of the data carrier.

In the case of a loose insert unit, it may be passive and designed to draw supply energy from the interrogation field, but it is also possible to provide the loose insert unit with its own energy source, for instance a battery. This increases the possibilities of using the insert unit independently, i.e., at a distance from the housing of the responder with the microwave part and the inductive interface 16.

The described system with integrated or combined responder assembly adequately provides for the need to make it possible for an inductive data carrier (such as a pass, a credit card, a smart card, etc.) which is used, for instance, for automatic admission to buildings or the like, to be used as well for identification at larger distances and/or for identification of objects moving at a relatively high velocity or persons located in such objects. Examples in point include admission systems for parking lots or multi-story parking garages, toll systems and the like.

The microwave frequency can, for instance, be between 1 GHz and 100 GHz. The frequency for inductive coupling lies in the radio-frequency range and may for instance be about 120 kHz. The same frequency can be used for modulation of the interrogation signal emitted by the microwave transmitter/receiver device. The auxiliary carrier wave on which the data is modulated by the encoder 30 can for instance be 60 kHz or another submultiple of the frequency used for the inductive coupling.

An additional advantage of the use of a combined responder is that if in embodiments as shown, for instance, in FIGS. 4, 5, 6 and 7, the battery 20 is empty, it remains possible to read out the data carrier via the inductive route. The above-mentioned and similar modifications are understood to fall within the scope of the invention.

I claim:

1. A system for the contactless exchange of data between at least one transmitter/receiver device and a plurality of responders, wherein at least one of the responders is designed to exchange data via a microwave connection with at least one of said at least one transmitter/receiver device operating in the microwave range and to exchange data via an inductive coupling with at least one inductively operating transmitter/receiver device, said at least one responder comprising a microwave antenna device, an inductively operating antenna device, and a data carrier, in which data is stored, wherein between the data carrier and the microwave antenna device means are connected for modulating a received microwave signal with data stored in the data carrier and wherein between the data carrier and the inductively operating antenna device means are connected for modulating an inductively received signal with data stored in the data carrier.

2. A system according to claim 1, wherein the microwave antenna device is designed for retroreflection of microwave energy.

3. A system according to claim 1, wherein the microwave antenna device is connected with a demodulator, which can demodulate a signal modulated on a received microwave signal and can apply the signal obtained after demodulation to the data carrier.

4. A system according to claim 3, wherein the signal obtained after demodulation is converted via a first AC/DC converter into supply voltage for the responder.

5. A system according to claim 4, wherein the inductively operating antenna device is connected with a second AC/DC converter, which in operation converts energy received by the antenna device into a DC supply voltage for the responder, and wherein, of the first and the second AC/DC converters, at least the second AC/DC converter is connected with a detector, which can demodulate data modulated on the supply voltage and can store the data in the data carrier.

6. A system according to claim 3, wherein the demodulator connected with the microwave antenna device is connected with a switching means via at least an integrator, and wherein, if the voltage built up by the integrator achieves a predetermined threshold value, said switching means connects an internal supply source provided in the responder with at least the data carrier.

7. A system according to claim 6, wherein the internal supply source comprises one or more solar cells.

8. A system according to claim 6, wherein between the demodulator and the integrator an amplifier with a low energy consumption is connected, which is permanently connected with the supply source.

9. A system according to claim 1, wherein the microwave antenna device is connected with a modulator, which is further connected with the data carrier and which can modulate data provided by the data carrier on microwave energy received by the microwave antenna device.

10. A system according to claim 1, wherein the inductively operating antenna device is connected with a first AC/DC converter, which in operation converts energy received by the antenna device into a DC supply voltage for the responder.

11. A system according to claim 1, wherein the data carrier is provided on a separate insert unit, which can be removably placed in a purposely formed receiving space of the housing of the responder.

12. A system according to claim 11, wherein the insert unit is provided with its own antenna coil device for contactless inductive coupling with the inductively operating antenna device of the associated responder.

13. A system according to claim 12, wherein the insert unit comprises a memory section, a modulator and a demodulator for modulating and demodulating, respectively, energy induced in the antenna coil device.

14. A system according to claim 13, wherein the insert unit is provided with its own internal supply source.

15. A system according to claim 14, wherein the internal supply sources comprise one or more solar cells.

16. A system according to claim 11, wherein the insert unit is constructed as a card.

17. A system according to claims 11, wherein the means for modulating a received microwave signal comprise an encoder which receives data provided by the data carrier and modulates it on an auxiliary carrier wave and applies the modulated auxiliary carrier wave to a modulator connected with the microwave antenna device, which modulator in operation modulates a received microwave signal with the modulated auxiliary carrier wave.

18. A system according to claim 17, wherein the data from the data carrier reaches the encoder via a filter and a threshold detector.

19. A system according to claim 1, wherein said at least one inductively operating transmitter/receiver device, belonging to the system, is designed to generate an electromagnetic field with a predetermined frequency and wherein said at least one of said at least one transmitter/receiver device operating in the microwave range, belonging to the system, is designed to emit a microwave signal on which a signal with the same frequency as the said predetermined frequency or with a frequency from which the predetermined frequency can simply be derived, has been modulated.

20. A system according to claim 19, wherein at least one of said at least one inductively operating transmitter/receiver device is designed for modulating the predetermined frequency with a data signal.

21. A responder of a system for the contactless exchange of data between one or more transmitter/receiver devices and a plurality of such responders, wherein the responder is designed to exchange data via a microwave connection with a transmitter/receiver device operating in the microwave range and to exchange data via an inductive coupling with an inductively operating transmitter/receiver device, the responder comprising a microwave antenna device, an inductively operating antenna device, and a data carrier, in which data is stored, wherein between the data carrier and the microwave antenna device means are connected for modulating a received microwave signal with data stored in the data carrier and wherein between the data carrier and the inductively operating antenna device means are connected for modulating an inductively received signal with data stored in the data carrier.

22. An insert unit of a system for the contactless exchange of data between one or more transmitter/receiver devices and a plurality of responders, wherein at least one of the responders is designed to exchange data via a microwave connection with a transmitter/receiver device operating in the microwave range and to exchange data via an inductive coupling with an inductively operating transmitter/receiver device, the at least one responder comprising a microwave antenna device, an inductively operating antenna device, and a data carrier, in which data is stored, wherein between the data carrier and the microwave antenna device means are connected for modulating a received microwave signal with data stored in the data carrier and wherein between the data carrier and the inductively operating antenna device means are connected for modulating an inductively received signal with data stored in the data carrier, said insert unit comprising the data carrier and wherein the insert unit may be removably placed in a receiving space of a housing of the responder.

* * * * *